Patented June 13, 1933

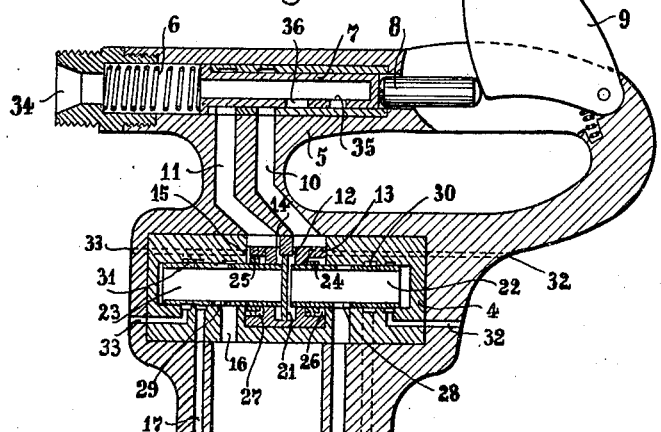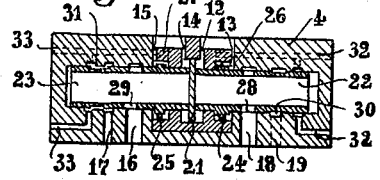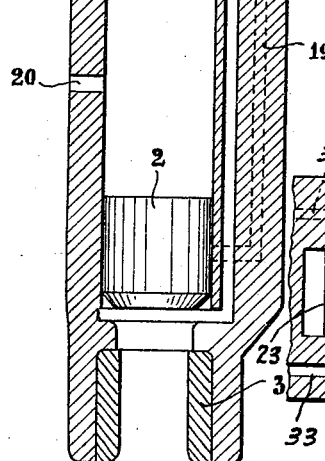

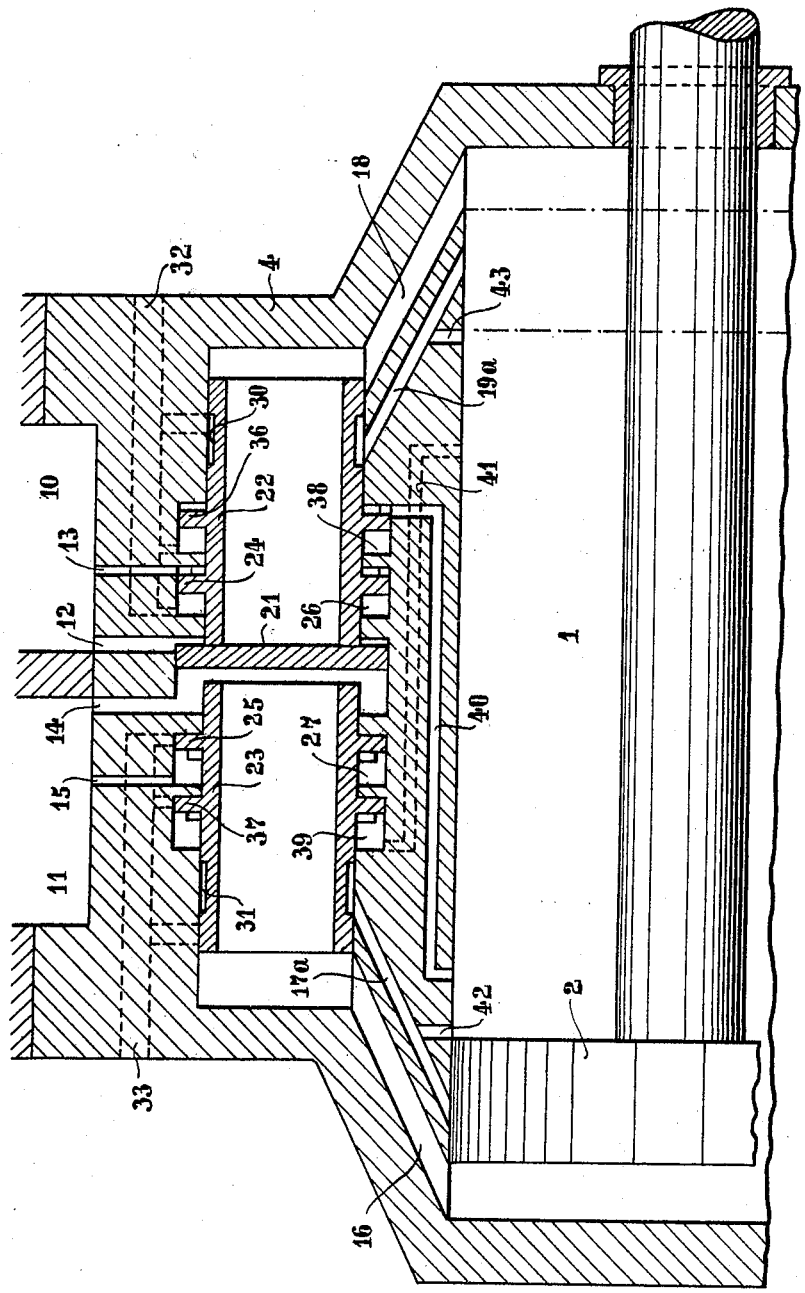

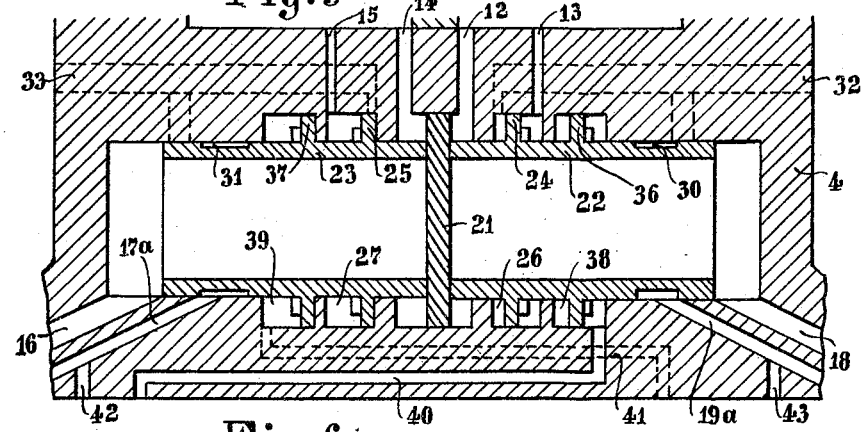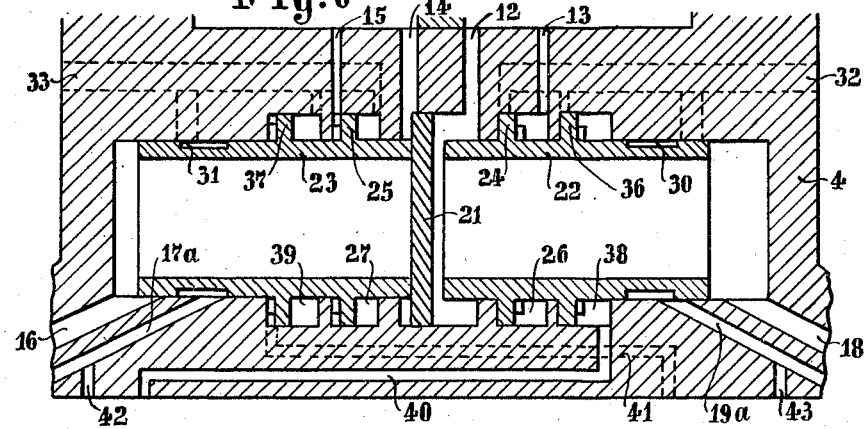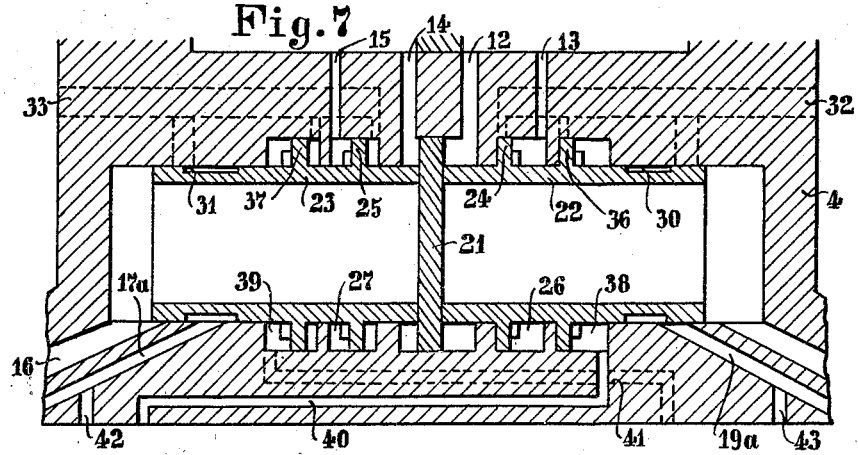

1,913,916

UNITED STATES PATENT OFFICE

CHARLES CARLOTTI, OF ST. SERVAIS-NAMUR, BELGIUM

CONTROLLING APPARATUS FOR PNEUMATIC TOOLS AND THE LIKE

Application filed February 25, 1931, Serial No. 518,254, and in Germany February 28, 1930.

This invention relates to controlling devices for pneumatic tools such as pneumatic hammers and the like and has special reference to an automatic reversing valve for such tools.

One important object of the invention is to improve and simplify the general construction of valves for this purpose.

A second important object of the invention is to provide a novel construction of such valves whereby the reversal is accomplished in two stages and whereby great economy in the use of compressed air or other actuating fluid is effected.

A third important object of the invention is to so construct the valve that increase in the length of stroke in the piston employed in such tools may be effected without appreciably increasing the consumption of compressed air or other actuating fluid.

A fourth important object of the invention is to provide an improved valve arrangement whereby the return or idle stroke of the piston in such a tool will be effected with but little consumption of actuating fluid.

A fifth important object of the invention is to provide a novel construction for such valves whereby braking of the piston at the ends of the strokes will be substantially eliminated so that there will be little or no loss of power especially at the end of the power stroke.

A sixth important object of the invention is to provide a novel construction of such devices whereby all escape of live air to the atmosphere is eliminated.

Two constructional embodiments of the invention are illustrated by way of example in the accompanying drawings in which, Fig. 1 illustrates the first example in longitudinal section through a complete pneumatic tool, Figs. 2 and 3 illustrate respectively sections through the controlling device with the controlling members in different positions, Fig. 4 illustrates the second example in longitudinal section through the most important parts of a pneumatic tool, and Figs. 5–7 are longitudinal sections through the controlling device with the controlling members in different positions.

Referring to the example illustrated in Figs. 1–3, 1 is the cylinder of the hammer in which the piston 2 is guided. At the front end of the cylinder there is located a guide 3 for the shaft of a chipper or of another tool while at the rear end of the cylinder there is provided a casing 4 containing the controlling means. In the handle 5 there is fitted the so-called starting valve which consists of an ordinary tubular slide valve 7 which is held by means of a spring 6 in the closed position and can be opened through the agency of a bolt 8 by a thumb lever 9. From the starting valve two fresh air supply passages 10, 11 lead to the central part of the control casing where they are each forked into two branches 12, 13 and 14, 15 respectively. The left-hand half of the control-casing 4 is connected with the rear part of the cylinder 1 by means of two passages 16, 17 of which the one 16 opens directly into the rear end of the cylinder and serves for the admission of air to the cylinder, while the opening of the other passage 17 which serves the purpose of an auxiliary exhaust passage is situated at some distance from the rear end of the cylinder. The right-hand half of the control casing 4 is connected by two passages 18, 19 with the front part of the cylinder 1. One of these passages, namely 18, which opens into the immediate proximity of the tool guide 3 again serves the purpose for the admission of air, and the other passage 19, the opening of which is arranged at some distance from the guide 3, acts on the other hand as an auxiliary exhaust. There is arranged at the side of the cylinder 1 the main exhaust 20, which consists as usual of a series of holes, and is controlled exclusively by the piston 2. The main exhaust 20 is located in the front half of the cylinder and is thus displaced forwardly in comparison with the known compressed air tools. At the same time the piston 2 is correspondingly shortened.

The casing 4 contains a controlling device consisting of three parts. There is arranged in the centre of the casing between the two branches 12, 14 of the air supply passages 10, 11 a reversible seating valve 21 which regulates the inlet of air in front of and behind the piston 2 and which, in the example illustrated, consists of a plate the edge of which is tight against the control casing. At opposite sides of this plate there are located two tubular slide valves 22, 23 which are open at both ends and are tightly guided in the casing 4. The two slide valves 22, 23 are each provided with a flange 24, 25 respectively which are each likewise tightly guided in an annular groove 26 and 27 respectively in the casing. The flanges 24 and 25 on the one hand have the task of limiting the movement of the slide-valves, by striking against the end faces of the grooves 26, 27, in such a manner that the stroke of the slide valves is smaller than the stroke of the valve body 21. On the other hand they serve the purpose of adjusting or displacing the slide valves 22, 23 for which purpose the annular grooves 26, 27 are in connection at their outer end faces with the branches 13, 15 respectively of the supply passages 10, 11. The flange 24 on the slide 22 has a slightly greater diameter than the flange 25 of the left-hand slide 23. The inner ends of the slides 22, 23 form the two seatings for the valve plate 21. In order that the air from the valve seatings can reach the controlling passages leading to the cylinder 1, the walls of the slides are provided with openings 28, 29 respectively of such a length that these openings are in connection at each position of the slides with the corresponding passages 18 and 16 respectively. A third task which the slides 22, 23 have to perform consists in controlling the auxiliary outlet passages 19, 17. For this purpose the wall of each slide is provided externally with an annular groove 30, 31 respectively which are so arranged that in the outer end positions as well as in an intermediate position of the slides 22 and 23 they connect the passages 19 and 17 respectively with one or more passages 32 and 33 respectively leading from the control casing to the free atmosphere, whereas in the inner end position of the slides the auxiliary exhausts 19, 32 and 17, 33 are closed respectively by the slides 22 and 23. The outlet passages 32, 33 are at the same time in part in connection with the inner end faces of the annular grooves 26, 27 in order that neither compression nor reduced pressure can occur on the insides of the flanges.

The method of operation of the new controlling device is as follows:—It is assumed that the controlling members 21, 22, 23 and the piston 2 are located in the position illustrated in Fig. 1 and that the starting valve 7 is opened. The fresh compressed air then flows out of the passages 10, 12 through the gap existing between the plate 21 and the slide 22, through the interior of the slide 22, the opening 28 and the passage 18 to the front end of the cylinder and drives the piston 2 backwards. An escape of air through the passage 19 is not possible as this is closed to the outlet passage 32 by the slide 22. The air present in front of the piston 2 is first conducted away through the main exhaust 20 and, after this has been closed by the piston 2, it is conducted through the passage 17, the annular groove 31 on the slide 23 and the passage 33. As soon as the piston has passed over the exhaust 20, a fall of pressure occurs in the front space in the cylinder and therefore, by way of the passage 18, in the right-hand side of the valve body 21, whereby the valve is relieved from pressure on the right-hand side. The consequence of this is that the plate 21, owing to the pressure of the fresh air acting on its left-hand side, and simultaneously also the slide 23, owing to the air pressure on its flange 25, are moved to the right until they come to rest owing to the plate 21 striking the slide 22. During this the slide 22 remains stationary in its left-hand end position since, after the plate 21 has struck the slide 22, the pressure on both sides of the plate 21 is again equal, the pressure on the flange 24 of the slide 22 on the other hand is greater than the pressure on the flange 25 of the slide 23. In this position of the controlling members (Fig. 2) the supply of fresh air to the cylinder is cut off so that a useless escape of air through the exhaust 20 is avoided. Meanwhile the piston 2 flies further towards the rear owing to its momentum. As soon as it has arrived at the passage 17 and has thereby closed the auxiliary exhaust, a compression of the air which is still present in the rear cylinder space behind the piston 2 takes place. The compression pressure is communicated through the opening 29 and the interior of the slide to the plate 21 whereby this is moved further towards the right taking the slide 22 with it until the slide arrives in its right-hand end position. Simultaneously with the plate 21 the slide 23 also moves to the right partly owing to the effect of the pressure of the fresh air on the flange 25 and partly owing to the compression pressure acting on its outer end surface. Since, however, owing to the limitation imposed by the flange 25 its movement ceases earlier than the movement of the plate 21 and the slide 22, a gap is formed between the slide 23 and the plate 21 whereby the fresh air inlet to the rear end of the cylinder is opened (Fig. 3). The fresh air now flows through the passages 11, 14 on the left of the plate 21, through the slide 23, opening 29 and passage 16 to behind the piston 2 and drives it forwards. An escape of fresh air through the auxiliary exhaust passage 17 is not possible as its connection with the outlet passages 33 is closed by the slide 23 which is located in its right-hand end position. The air present in front of the piston 2 escapes at first again through the exhaust 20 and, after this has been closed, through the auxiliary exhaust 19, which, since the slide 20 is in its right-hand end position, is connected by way of the annular groove 30 with the passages 32 leading to the atmosphere. As soon as the rear end of the piston 2 has, owing to the movement of the piston, freed the exhaust 20 the pressure in the rear space of the cylinder and therefore also on the left hand side of the valve is released. The plate 21 and the slide 22 are now moved to the left by the fresh air pressing against the right-hand side of the plate 21 and against the flange 24, whereby the plate 21 places itself on its seating on the slide 23 and carries this slide with it until the controlling members come to rest owing to the flange 24 of the slide 22 striking against the left-hand face of the groove 26. The position illustrated in Fig. 2, in which the fresh air supply to the cylinder 1 is cut off, is then again reached. Since the slide 22 is now located in its left-hand end position the auxiliary exhaust 19, 32 for the front cylinder space is closed. The piston 2 which flies further forward owing to its momentum until it meets the shaft of the cutter therefore compresses the air which is still present in front of the piston. The compression pressure is communicated through the passage 18, opening 28 and slide 22 to the right-hand side of the plate 21 and presses the plate 21 together with the slide 23 into the left-hand end position. Since the slide 22 which is already in its left-hand end position is unable to follow, a gap is formed between the plate 21 and the slide 22 so that the air inlet to the front end of the cylinder is again opened (Fig. 1). The cycle of operations which has been described is then repeated.

As will be clear, the reversal of motion takes place in two stages with the new controlling device. In the first place owing to the one-sided relief of pressure on the reversing valve which occurs on the freeing of the main exhaust 20 only the supply of fresh air to the cylinder is cut off, and then when the piston has reached the end of its stroke a complete reversal takes place, owing to the compression produced whereby the air inlet to the other side of the piston is opened. Owing to the fact that the air supply is interrupted directly after the cylinder exhaust 20 is set free, the outflow of fresh air, which occurs in the case of the known tools until the end of the stroke of the piston, is avoided and thus a considerable economy in air is effected. This economy is still further increased since owing to the forward displacement of the exhaust 20 only a small quantity of air is needed for the idle return stroke of the piston. The forward displacement of the exhaust port 20 which is enabled to be made owing to the two-stage control has the further advantage that the piston 2 is acted upon by the air for a longer time on its effective stroke and therefore strikes the shaft of the tool with very great force.

The division of the controlling member into three parts which can be adjusted as desired when not under pressure necessitates, in the case of those tools which can take up different positions as desired, a special control of the supply of air on starting the tool in order that the tool may start to act properly even when the position of the controlling members does not correspond to the position at the time of the piston, which can be located according to the manner in which the tool is held, at the front or at the rear end of the cylinder. For this purpose the starting slide-valve 7 is provided with two separate openings 35 and 36 for connecting the supply passages 10, 11 with the compressed air inlet 34, and the distance between the centres of these openings is slightly greater than the distance between the centres of the two passages 10, 11 and the left-hand opening 36 of the two openings is formed as an elongated hole. In the position of rest illustrated in Fig. 1, the slide valve 7 closes both passages 10, 11. If it is pushed by pressure on the lever 9 in the opening direction, viz to the left, then the passage 10 is first opened through the elongated hole 36 so that fresh air flows through this passage to the control casing 4. The plate 21 and the two slides 22, 23 are then moved into the position illustrated in Fig. 1, owing to the air pressure on the right-hand side of the plate 21 and on the flange 24 of the slide 22, and the air inlet to the front end of the cylinder is thereby opened. If the piston 2 is at the front end of the cylinder it will be thrown backwards by the air whereby it releases the exhaust 20. If on the other hand the piston 2 were in its rear end position then the opening of the air inlet to the front end of the cylinder only results in the air flowing away through the exhaust 20. On the continued movement of the starting slide valve 7 to the left the passage 10 is again closed and the air supply passage 11 is opened likewise by the elongated hole 36. The compressed air flowing on the left hand side of the plate 21 and into the groove 27 then moves the controlling members into the position illustrated in Fig. 3, since the right-hand side of the controlling means is relieved from pressure, so that the air inlet to the rear end of the cylinder is now opened. The air then flows behind the piston 2, which was either located already on starting in its rear end position or has reached this position in the meantime, and drives it forwards. The starting slide valve, which is continuously moved to the left, has then finally reached its left-hand end position in which both its openings 35, 36 coincide with the openings of the passages 10, 11, that is to say air for controlling purposes is conducted through both the passages 10 and 11. The apparatus is then in the condition for operating so that on the forward stroke of the piston, which is initiated in the manner which has just been described, the normal method of control begins, that is in the first place after the cylinder exhaust 20 has been opened the fresh air supply to the cylinder is cut off and then at the end of the stroke of the piston the air inlet to the front end of the cylinder is opened. It is clear, therefore, that this new method of starting ensures that the tool starts to operate properly no matter what the position of the controlling parts 21, 22, 23 and the piston 2 may have taken up in the condition of rest preceding the starting.

The example illustrated in Figs. 4 to 5 agrees fundamentally with that of Figs. 1–3 in that the fresh air reversing valve 21 is arranged between two tubular slide valves 22, 23 which form the seatings for the valve 21 and serve the purpose of conducting the air to the passages 16, 18 leading to the ends of the cylinder. A small difference from the construction illustrated in Figs. 1–3 consists in that the air passages leading to the ends of the cylinder open into the outer end faces of the control casing 4, that is to say approximately at the outer front faces of the slides 22, 23 so that the lateral openings 28, 29 in the slides which are present in the first example are unnecessary. There is a further agreement with the first example in that each of the tubular slide valves 22, 23 is provided with a flange 24, 25 respectively which is always under fresh air pressure tending to move the slides towards one another and that each of them contains an annular groove 30, 31 respectively for controlling the exhaust or used air. The following important differences, however, exist.

The two tubular slide valves 22, 23, in addition to the flanges 24, 25 which are always subject to fresh air pressure, each possess a second flange 36, 37 respectively which are also tightly guided in annular grooves 38, 39 respectively of the control casing 34. The outer front face of the annular groove 38 containing the flange 36 of the right-hand slide 22 is in connection with a passage 40 which leads the left-hand half of the cylinder 1 and opens into it at some distance from the left-hand end of the cylinder, whereas the outer front face of the annular groove 39 containing the flange 37 of the left-hand slide 23 is connected to a passage 41 which leads to the right-hand half of the cylinder and likewise opens into it at some distance from the right-hand end of the cylinder. Therefore, working air from the cylinder 1 can be conducted through the passages 40, 41 to the flanges 36, 37 in order to effect an adjustment of the tubular slides 22, 23. The cylinder exhaust 20 which is present in the example according to Figs. 1–3 and leads directly into the atmosphere is omitted. The discharge of exhaust air takes place exclusively through the exhaust passages 17a, 19a, which open into the cylinder near the ends between the air passages 16 and 18 and the controlling passages 40 and 41 respectively, and which are controlled by the two slide valves 22, 23. The control of the exhaust passages 17a, 19a is then effected in the following manner. The passages 17a, 19a when the slides 22, 23 are located in their outer end positions, are connected by way of the annular grooves 30, 31 with the passages 32, 33 which lead to the atmosphere, whereas in the inner end positions of the slides 22, 23 the passages 17a, 19a are shut off by the slides from the passages 33, 34 leading to the atmosphere. The ends of the exhaust passages 17a, 19a leading to the cylinder 1 each possess a branch 42, 43 respectively the mouths of which are slightly further distant from the adjacent end of the cylinder than the mouths of the main exhaust passages 17a and 19a respectively. The distance of the mouth of each of the branch passages 42, 43 from the adjacent end of the cylinder is in fact slightly greater than the length of the working piston 2.

The method of operation of the modified form of control according to Figs. 4–6 is as follows:—

It is assumed that the controlling members 21–23 and the piston 2 are located in the position illustrated in Fig. 4. The fresh air supplied through the passage 11 then flows through the gap existing between the slide 23 and the plate 21, the interior of the slide 23 and the passage 16 to the left-hand end of the cylinder and drives the piston 2 to the right. An escape of air through the exhaust passages 17a, 42 is not possible as their connection to the passage 33 leading to the atmosphere is cut off. The used or exhaust air present in front of the piston 2 can, on the other hand, escape, since the exhaust passages 19a, 43 at the right-hand end of the cylinder are in connection by way of the annular groove 30, and the passage 33 with the atmosphere. As soon as the piston 2 has passed over the mouth of the passage 40 working air flows out of the cylinder 1 to the right-hand side of the flange 36 of the slide 22. The pressure on the two flanges 24, 36 and on the edge portion of the right-hand face of the plate 21 projecting beyond the slide 22 is then greater than the pressure on the left-hand side of the plate, the result of which is that the slide 22 and the plate 21 move together to the left until the plate 21 places itself on its seating on the slide 23 (Fig. 5). A further movement taking the slide 23 with it is not possible because, directly after the contact of the plate 21 with the slide 23, the fresh air pressure on the part of the plate 21 projecting beyond the slide 23 and on the flange 25 of the slide 23 together with the pressure of the working air on the near face of the slide 23 and on the left face of the plate 21 within the section of the slide opposes the further movement and the total of these pressures is greater than the pressures which effected the movement of the slide 22 and the plate 21 to the left. The controlling members thus come to rest in the position illustrated in Fig. 5. In this position the supply of fresh air to the cylinder is entirely cut off. The working air present in the left-hand cylinder space now expands and the movement of the piston therefore continues. When the piston 2 on its further travel has passed over the mouth of the passage 41, working air flows to the left-hand side of the flange 37 on the slide 23. But, since this slide is in its right-hand end position, this pressure on the flange remains without effect. Towards the end of its stroke the piston 2 closes the mouths of the exhaust passages 19a, 43, and the air which is still present in front of the piston is compressed. The compression pressure is communicated through the passage 18 to the slide 22 and the plate 21 and acts on these parts tending to move them to the left. As soon as the piston 2 has reached the end of its stroke it frees, on the side on which the expanding working air acts, the mouth of the auxiliary exhaust passage 43 (this position of the piston is illustrated in dotted lines in Fig. 4) so that the working air can escape by way of passages 43, 19a, annular groove 30 and passage 32. There is therefore a sudden fall in pressure behind the piston 2 and, by way of the passage 16, in the slide 23, whereby the rear face of the slide 23 and the left-hand side of the plate 21 are relieved from pressure. The result of this is that, partly under the action of the fresh air pressure on the edge portion of the right-hand face of the plate 21 and on the flange 24 and partly owing to the compression pressure acting simultaneously on the inner part of the right-face of the plate 21 and the right-face of the slide 22, the slide 22 and the plate 21 are moved to the left taking the slide 22 with them. Whereas the slide 22, owing to its flanges 24, 36 striking the left-hand faces of the grooves 26, 38, comes to rest, the plate 21 together with the slide 23, under the action of the compression pressure acting on the part of the right-hand face of the plate 21 lying inside the slide 22 which compression pressure outweighs the air pressure on the flange 25 of the slide 23, move still further, until the slide 23 has arrived at its left-hand end position whereby a gap is formed between the plate 21 and its seating on the slide 22 (position illustrated in Fig. 6). On the one hand, the air inlet to the right-hand end of the cylinder is now opened and the exhaust at this end of the cylinder, on the other hand, is closed by the slide 22, while at the same time the exhaust at the left-hand end of the cylinder is opened by the annular groove 31 of the slide 23. The fresh air supplied through the passage 10 flows to the right-hand end of the cylinder and drives the piston 2 to the left, whereby the exhaust air present in front of the piston is conducted away through the passages 17a, 42, annular groove 41 and passage 33 to the atmosphere. As soon as the piston 2 has passed over the mouth of the passage 41, working air flows out of the cylinder 1 into the annular groove 39, the result of which is that the total pressure on the two flanges 25, 37 of the slide 43 and on the part of the left-hand face of the plate 21 which projects beyond the slide 23 outweighs the pressure on the right-hand side of the plate, whereby the slide 23 and plate 21 are moved in common to the right until the plate 21 places itself on its seating on the slide 22 (Fig. 7). In this position the controlling parts again come to rest since the slide 22 cannot be carried along, because, as soon as the plate 21 rests against the slide 22, the pressure of the fresh air on the edge portion of the right-hand side of the plate and on the flange 24 together with the pressure of the working air on the inner portion of the right-hand side of the plate and on the right face of the slide 22 is greater than the pressure acting on the left-hand side of the slide 23 and the plate 21. The supply of fresh air to the working cylinder is now again cut off and the piston 2 is moved further by the working air expanding in the right-hand cylinder space. As soon as the piston 2 has passed over the mouth of the passage 40, the working air flows through the passage 40 to the annular groove 38, which, however, is without effect because the slide 22 is located in its left-hand end position. Towards the end of its stroke the piston 2 closes the exhaust passages 42, 17a at the left-hand end of the cylinder, so that the used or exhaust air still present in the cylinder is now compressed. The compression pressure is communicated through the passage 16 to the left-hand side of the controlling device and acts on the surface of the valve 21 lying inside the section of the slide. At the end of its stroke the piston 2 finally passes over the mouth of the auxiliary exhaust passage 42 so that the working air can escape and a sudden fall in pressure occurs in the right-hand cylinder space and therefore in the interior of the slide 22. The result of this is that, owing to the fresh air pressure on the edge portion of the left-hand face of the valve plate 21 and to the compression pressure on the inner part of this face, the valve plate 21 is moved to the right taking the slide 22 with it until the slide 22 reaches its right-hand end position. Since the slide 23 can only partly follow this movement, namely until its flanges 25, 37 strike the right-hand front faces of the grooves 27, 39, a gap is formed between the valve seating formed by this slide and the plate 21 whereby the fresh air inlet to the left-hand cylinder space is opened. The position of Fig. 4 is thereby again arrived at and the cycle of operations described is repeated.

Thus it will be seen that with this controlling device, no flow of fresh air into the atmosphere occurs so that air losses are entirely avoided. Owing to the fact that, when the piston has traversed a portion of its stroke, the fresh air inlet to the cylinder is completely closed and the further movement of the piston 2 is effected by expansion of the working air an almost complete utilization of the compressed air pressure is obtained.

In the form of construction of the controlling device according to Figs. 4–7, in the case also of machines which can be brought into any desired positions, a specal regulation of the air supply on starting is necessary. For this purpose there are provided, as in the case of the example according to Figs. 1–3, separate air-supply passages 10, 11 for the two sides of the controlling device, which passages can be opened one after the other by means of a starting slide valve similar to the slide valve 7 illustrated in Fig. 1. Since the arrangement and method of operation of the starting slide valve are the same as that of example according to Figs. 1–3 it is unnecessary again to illustrate and describe the starting slide valve in combination with the example according to Figs. 4–7.

I claim:

1. In a pneumatic tool having a cylinder and a piston reciprocable therein, a valve housing of elongated cylindrical form having closed spaced inlet ports for live air in opposite sides of the center of its length and spaced outlet ports for live air on opposite sides of said center and more remote therefrom than the inlet ports, tubular slide valves each located in a respective end of the housing and each movable to open and close a respective outlet port, the ends of said tubular valves adjacent the center of the housing being open to receive air from respective inlet ports, and a valve member located between said tubular valves and movable into and out of seating relation with said open ends to control the flow of air from respective inlet ports to the interior of the respective tubular valves.

2. In a pneumatic tool having a cylinder and a piston reciprocable therein, a valve housing of elongated cylindrical form having closed spaced inlet ports for live air on opposite sides of the center of its length and spaced outlet ports for live air on opposite sides of said center and more remote therefrom than the inlet ports, tubular slide valves each located in a respective end of the housing and each movable to open and close a respective outlet port, the ends of said tubular valves adjacent the center of the housing being open to receive air from respective inlet ports, a valve member located between said tubular valves and movable into and out of seating relation with said open ends to control the flow of air from respective inlet ports to the interior of the respective tubular valves, and means constantly urging said tubular valves toward the center of the housing.

3. In a pneumatic tool having a cylinder and a piston reciprocable therein, a valve housing of elongated cylindrical form having closed spaced inlet ports for live air in opposite sides of the center of its length and spaced outlet ports for live air on opposite sides of said center and more remote therefrom than the inlet ports, tubular slide valves each located in a respective end of the housing and each movable to open and close a respective outlet port, the ends of said tubular valves adjacent the center of the housing being open to receive air from respective inlet ports, a valve member located between said tubular valves and movable into and out of seating relation with said open ends to control the flow of air from respective inlet ports to the interior of the respective tubular valves, and means to impart live air pressure to said tubular valves in a direction urging said tubular valves toward the center of the housing.

4. In a pneumatic tool having a cylinder and a piston reciprocable therein, a valve housing of elongated cylindrical form having closed spaced inlet ports for live air on opposite sides of the center of its length and spaced outlet ports for live air on opposite sides of said center and more remote therefrom than the inlet ports, tubular slide valves each located in a respective end of the housing and each movable to open and close a respective outlet port, the ends of said tubular valves adjacent the center of the housing being open to receive air from respective inlet ports, a valve member located between said tubular valves and movable into and out of seating relation with said open ends to control the flow of air from respective inlet ports to the interior of the respective tubular valves, and means constantly urging said tubular valves toward the center of the housing, said valves being arranged to permit greater movement of said valve member than the movements of the respective tubular valves.

5. In a pneumatic tool having a cylinder and a piston reciprocable therein, a valve housing of elongated cylindrical form having closed spaced inlet ports for live air in opposite sides of the center of its length and spaced outlet ports for live air on opposite sides of said center and more remote therefrom than the inlet ports, tubular slide valves each located in a respective end of the housing and each movable to open and close a respective outlet port, the ends of said tubular valves adjacent the center of the housing being open to receive air from respective inlet ports, a valve member located between said tubular valves and movable into and out of seating relation with said open ends to control the flow of air from respective inlet ports to the interior of the respective tubular valves, and means to impart live air pressure to said tubular valves in a direction urging said tubular valves toward the center of the housing, said valves being arranged to permit greater movement of said valve member than the movements of the respective tubular valves.

6. In a pneumatic tool having a cylinder and a piston reciprocable therein, a valve housing of elongated cylindrical form having closed spaced inlet ports for live air in opposite sides of the center of its length and spaced outlet ports for live air on opposite sides of said center and more remote therefrom than the inlet ports, tubular slide valves each located in a respective end of the housing and each movable to open and close a respective outlet port, the ends of said tubular valves adjacent the center of said housing being open to receive air from respective inlet ports, and a valve member located between said tubular valves and movable into and out of seating relation with said open ends to control the flow of air from respective inlet ports to the interior of the respective tubular valves, said outlet ports communicating with opposite ends of the tool cylinder, said tool having exhaust passages leading from opposite ends of the cylinder to the external air and respectively controlled to open and close by the movements of said tubular valves, said tool further having an outlet port leading from the cylinder adjacent its center to the outer air and opened to communication with respective ends of the cylinder by the movements of said piston.

7. In a pneumatic tool having a cylinder and a piston reciprocable therein, a valve housing of elongated cylindrical form having closed spaced inlet ports for live air on opposite sides of the center of its length and spaced outlet ports for live air on opposite sides of said center and more remote therefrom than the inlet ports, tubular slide valves each located in a respective end of the housing and each movable to open and close a respective outlet port, the ends of said tubular valves adjacent the center of the housing being open to receive air from respective inlet ports, a valve member located between said tubular valves and movable into and out of seating relation with said open ends to control the flow of air from respective inlet ports to the interior of the respective tubular valves, and means constantly urging said tubular valves toward the center of the housing, said outlet ports communicating with opposite ends of the tool cylinder, said tool having exhaust passages leading from opposite ends of the cylinder to the external air and respectively controlled to open and close by the movements of said tubular valve, said tool further having an outlet port leading from the cylinder adjacent its center to the outer air and opened to communication with respective ends of the cylinder by the movements of said piston.

8. In a pneumatic tool having a cylinder and a piston reciprocable therein, a valve housing of elongated cylindrical form having closed spaced inlet ports for live air in opposite sides of the centers of its length and spaced outlet ports for live air on opposite sides of said center and more remote therefrom than the inlet ports, tubular slide valves each located in a respective end of the housing and each movable to open and close a respective outlet port, the ends of said tubular valves adjacent the center of the housing being open to receive air from respective inlet ports, a valve member located between said tubular valves and movable into and out of seating relation with said open ends to control the flow of air from respective inlet ports to the interior of the respective tubular valves, and means to impart live air pressure to said tubular valves in a direction urging said tubular valves toward the center of the housing, said outlet ports communicating with opposite ends of the tool cylinder, said tool having exhaust passages leading from opposite ends of the cylinder to the external air and respectively controlled to open and close by the movements of said tubular valve, said tool further having an outlet port leading from the cylinder adjacent its center to the outer air and opened to communication with respective ends of the cylinder by the movements of said piston.

9. In a pneumatic tool having a cylinder and a piston reciprocable therein, a valve housing of elongated cylindrical form having closed spaced inlet ports for live air on opposite sides of the center of its length and spaced outlet ports for live air on opposite sides of said center and more remote therefrom than the inlet ports, tubular slide valves each located in a respective end of the housing and each movable to open and close a respective outlet port, the ends of said tubular valves adjacent the center of the housing being open to receive air from respective inlet ports, a valve member located between said tubular valves and movable into and out of seating relation with said open ends to control the flow of air from respective inlet ports to the interior of the respective tubular valves, and means constantly urging said tubular valves toward the center of the housing, said valves being arranged to permit greater movement of said valve member than the movements of the respective tubular valves, said outlet ports communicating with opposite ends of the tool cylinder, said tool having exhaust passages leading from opposite ends of the cylinder to the external air and respectively controlled to open and close by the movements of said tubular valve, said tool further having an outlet port leading from the cylinder adjacent its center to the outer air and opened to communication with the respective ends of the cylinder by the movements of said piston.

10. In a pneumatic tool having a cylinder and a piston reciprocable therein, a valve housing of elongated cylindrical form having closed spaced inlet ports for live air in opposite sides of the center of its length and spaced outlet ports for live air on opposite sides of said center and more remote therefrom than the inlet ports, tubular slide valves each located in a respective end of the housing and each movable to open and close a respective outlet port, the ends of said tubular valves adjacent the center of the housing being open to receive air from respective inlet ports, a valve member located between said tubular valves and movable into and out of seating relation with said open ends to control the flow of air from respective inlet ports to the interior of the respective tubular valves, and means to impart live air pressure to said tubular valves in a direction urging said tubular valves toward the center of the housing, said valves being arranged to permit greater movement of said valve member than the movements of the respective tubular valves, said outlet ports communicating with opposite ends of the tool cylinder, said tool having exhaust passages leading from opposite ends of the cylinder to the external air and respectively controlled to open and close by the movements of said tubular valve, said tool further having an outlet port leading from the cylinder adjacent its center to the outer air and opened to communication with the respective ends of the cylinder by the movements of said piston.

In testimony whereof I affix my signature.

CHARLES CARLOTTI.